United States Patent Office 2,771,481
Patented Nov. 20, 1956

2,771,481

CATALYTIC CARBON MONOXIDE HYDROGENATION

Walter Rottig, Oberhausen-Sterkrade-Nord, Germany, assignor to Ruhrchemie Aktiengesellschaft and Lurgi Gesellschaft fur Warmetechnik m. b. H., both German corporations No Drawing. Application March 7, 1951,
Serial No. 214,423

Claims priority, application Germany April 20, 1950

6 Claims. (Cl. 260—449.6)

This invention relates to improvements in catalytic carbon monoxide hydrogenation. It relates particularly to improvement in the catalyst preparation in carbon monoxide hydrogenation.

Cobalt, nickel or iron catalyzers which are used in catalytic hydrogenation of carbon monoxide must be treated with reducing gases prior to their application. It is not possible to obtain sufficient catalyzer activity without this reduction. Carbon monoxide and/or hydrogen containing gas mixtures are used in this pre-treatment which is called catalyzer reduction or catalyzer formation. The catalyzer reduction is conventionally effected outside of the synthesis oven, since prior to the present invention it could only be accomplished with relatively small layer heights at a temperature of approximately 300° C. Up to the present time all efforts to reduce the carbon monoxide hydrogenation catalyzers in the synthesis ovens have been unsuccessful. The pre-treatment in the synthesis oven itself proved technically impossible for two reasons.

First, the hydrogenation of carbon monoxide, i. e. the synthesis proper is executed at normal and medium pressures and temperatures between 180° and 220° C. In the process about 80 to 120 parts by volume of the synthesis gas per one part by volume of the catalyzer is put through per hour. During the catalyzer reduction a gas temperature of nearly 300° C. is required. The conventional synthesis ovens may be used for temperatures up to nearly 250° C., since the heat exchange installation, i. e. the cooling jackets in the oven are built for a maximum steam pressure of about 30 kg./cm.$^2$. During the reduction of the catalyzer the pressure water circulating in the heat exchange parts would be heated to a temperature of nearly 300° C. which would cause a steam pressure of nearly 85 kg./cm.$^2$. The conventional synthesis ovens are not constructed to withstand such pressure.

Second, apart from these structural difficulties, it has been impossible to effect the reducing treatment in the synthesis oven itself because a certain constancy of the catalyzer pre-treatment is required and because of the height of the catalyzer layer to be maintained in the oven during the reduction. Conventionally catalyzer reduction is performed with layers of only 20 to 40 cms. high, because no uniform reduction is possible with higher layers. A still further obstacle lies in the fact that the catalyzer during its reduction shrinks considerably, sometimes up to 50% of its volume.

In the carbon monoxide hydrogenation the catalyzers after their precipitation are formed while they are still relatively moist. After being formed they are dried at a temperature of nearly 110° C. A catalyzer tube of 4 to 5 meters in length which is filled with the formed and pre-heated catalyzer sometimes shows a shrinking of up to 50% of the original height of the catalyzer if the treatment with reducing gases is applied in the oven. Thus, if the pre-treatment took place in the synthesis oven it would be filled up to only 50% capacity with catalyzer, which of course is very uneconomical.

One object of this invention is catalyzer reduction in carbon monoxide hydrogenation without the aforementioned difficulties.

A further object is catalyzer reduction which may be effected in the synthesis oven. This and further objects will become apparent from the following description.

It has now been found that these difficulties in the catalytic hydrogenation of carbon monoxide, i. e. the uneven reduction of the catalyzer in layers of more than 50 cms. in height and the shrinking of the catalyzer columns, may be avoided in the following manner:

After the catalyzers have been formed and partially dried at a temperature of nearly 110° C., they are dried thoroughly for 6 to 24 hours at a temperature ranging between 150° and 350° C. and preferably 175° to 250° C. before their reduction and formation with gas mixtures containing carbon monoxide and/or hydrogen. After the thorough drying, the catalyzers are placed in the synthesis oven in layers of more than 100 cms. high and preferably in layers of 400 to 1,000 cms. in height. These layers are then reduced with gas mixtures containing carbon monoxide and/or hydrogen at flow speeds of about 100 to 200 cms./sec. at 760 mm. Hg and 0° C.

The thorough drying of the unreduced catalyzer at temperatures ranging from 150 to 350° C. prevents the subsequent shrinking during the reduction within the synthesis oven. By operating with reducing gases having a linear speed of 100 to 200 cms./sec. it is possible to reduce catalyzer columns of 5 to 10 meters in length in an absolutely uniform fashion in 60 to 120 minutes. With the conventionally used reducing gas speeds of about 20 to 40 cms./sec., it is impossible to obtain a uniform reducing action over the entire catalyzer column.

The reduction of the catalyzer, according to the invention, can be carried out with water gas, hydrogen, carbon monoxide or other gas mixtures which contain carbon monoxide and hydrogen in any ratio desired. It has been found especially advantageous to free as completely as possible the reducing gases from steam and carbon dioxide prior to their use. Under the conditions described, the reducing pre-treatment of cobalt and iron catalyzers can be carried out at considerably lower temperatures than were heretofore used, i. e. between 150 and 250° C. Of course it is possible to use higher reduction temperatures. The lower reduction temperatures are, however, especially advantageous if the catalyzer may have a lower reducing value and is to be used for the manufacture of hydrocarbons.

There are no technical difficulties involved in using high gas flow speeds during the reduction of the catalyzer within the synthesis oven, as synthesis is now conventionally carried out at considerably higher gas speeds than were formerly used. For this reason the capacity of the gas blowers presently in use is always high enough so that a speed of the reduction gas of nearly 200 cm./sec. (760 mm. Hg and 0° C.) may be obtained without any difficulty.

In the catalyst reduction or formation in accordance with the invention which is especially suited for iron catalysts, the subsequent carbon monoxide hydrogenation may be carried out with approximately 10 to 20 times of the normal gas load, i. e. 1000 to 2000 volumes/hr. of gas per volume of catalyst. A satisfactory removal of reaction heat is thus obtained with the use of uniformly boiling liquids (as cooling media) even with synthesis tubes having a diameter between 20 and 60 mm., the rates of the synthesis gases to be in excess of 50 cm./sec., preferably 200 cm./sec. (based upon 760 mm. mercury, 0° C., and the empty tube cross section). The rates correspond to the aforesaid gas loads of the catalyst. At these high gas speeds turbulent movements within the gas phase take place which are sufficient to carry the heat of reaction to the walls of the tube quickly and effectively. From the walls of the tube the heat is efficiently removed by the uniformly boiling cooling medium and the absorbed heat of evaporation. The homogeneity of the cooling medium insures, disregarding small hydrostatic differences, a sufficient dissipation of the heat of reaction at all levels of the catalyzer column. A harmful over-heating of the catalyzer is thus completely avoided.

Numerous liquids which boil within the temperature range of the synthesis at pressure which can be easily controlled are suitable for use as the cooling media according to the invention. Water has proven to be the most ideal medium. However, its use is often impossible because the steam pressure produced at synthesis temperatures of nearly 270° C. exceeds 50 mg./cm.$^2$. This steam pressure requires the walls of the cooling system to be of such strength that their construction cannot be accomplisehd economically. When using cooling media which boil between approximately 250 and 280° C. at ordinary atmospheric pressure at pressures up to 10 to 20 kg./cm.$^2$, operation with comparatively thin walls is possible. The following cooling media have been found particularly suitable for this purpose: glycol, aniline, nitro-benzol, aliphatic or aromatic hydrocarbons of an adjusted molecular size and boiling point. When selecting the cooling media, however, particular care must be taken that the boiling point is such that evaporation takes place as sufficient and intense dissipation of the heat of reaction is only possible with this evaporation.

It has been found particularly advantageous to carry out the carbon monoxide hydrogenation according to the invention with a cycloid circulation of the synthesis gases. When operating in this manner, 0.5 to 10 and preferably 1 to 4 parts per volume of the re-circulated gas per unit part by volume of the fresh gas should be used. The synthesis pressure may be maintained between 10 and 100 kg./cm.$^2$, the optimum gas pressures being between 10 and 30 kg./cm.$^2$, and the inside diameter of the synthesis tubes may be as large as 20 to 60 mm., since a sufficiently fast dissipation of the reaction heat takes place due to the turbulent movement of the fast flowing synthesis gases.

The process according to the invention has a technical advantage in eliminating separate reduction installations which are now required for the manufacture of the catalyzers, and is very expensive in most cases. This is possible as the reducing pre-treatment of the catalyzers may be carried out in the synthesis oven itself. This process also facilitates the transportation and filling in of the catalyzers, as it can be done without the necessity of having an oxygen-free protective gas atmosphere, since the non-reduced catalyzer does not become hot when handled in the open.

I claim:

1. In the hydrogenation of carbon monoxide using a catalyst selected from the group consisting of iron, nickel and cobalt, the improvement which comprises thoroughly drying the catalyst for 6 to 24 hours at temperatures of 150 to 350° C., contacting the dried catalyst in layers of more than 100 cm. high within a synthesis zone with a gas selected from the group consisting of carbon monoxide, hydrogen and mixtures thereof at a linear flow speed of about 100 to 200 cm./sec. and thereafter intimately contacting said treated catalyst with a carbon monoxide hydrogenation synthesis gas mixture in said synthesis zone.

2. Improvement according to claim 1 in which the catalyst is formed and partially dried at a temperature of about 110° C. prior to said thorough drying.

3. Improvement according to claim 1 in which said thorough drying is effected at temperatures of about 175 to 250° C., and the catalyst is contacted with said gas mixtures in layers 400 to 1,000 cms. in height.

4. Improvement according to claim 1 in which said gas selected from the group consisting of carbon monoxide, hydrogen and mixtures thereof is substantially freed of water and carbon dioxide before said contacting.

5. Improvement according to claim 1 in which said contacting with the carbon monoxide hydrogenation synthesis gas mixture is effected with indirect heat exchange with a substantially uniformly boiling liquid with the treated catalyst firmly arranged in tubes of 20 to 60 mm. in diameter at gas speeds of about 50–200 cm./sec. in amounts of about 500–2,000 parts per volume of gas per hour per unit volume of the catalyst.

6. Improvement according to claim 5 in which said intimate contacting is effected with gas velocities of more than 200 cm./sec. with gas amounts of about 1000–2,000 parts per volume per unit part of catalyzer.

References Cited in the file of this patent

UNITED STATES PATENTS

| | | |
|---|---|---|
| 1,909,133 | Silverman et al. | May 16, 1933 |
| 2,274,639 | Scheuermann et al. | Mar. 3, 1942 |
| 2,411,760 | Sensel | Nov. 26, 1946 |
| 2,620,347 | Rottig | Dec. 2, 1952 |
| 2,662,090 | Scharmann | Dec. 8, 1953 |
| 2,662,911 | Dorschner et al. | Dec. 15, 1953 |

FOREIGN PATENTS

| | | |
|---|---|---|
| 528,617 | Great Britain | Nov. 1, 1940 |

OTHER REFERENCES

Storch et al.: "Fischer-Tropsch and Related Synthesis," John Wiley and Sons, Inc., New York (1951), pages 136–137 and 205.